No. 650,885. Patented June 5, 1900.
S L. WIEGAND.
ELECTRIC STORAGE BATTERY AND CONDUCTING PLATE THEREFOR.
(Application filed June 5, 1897. Renewed Oct. 30, 1899.)
(No Model.) 2 Sheets—Sheet 1.
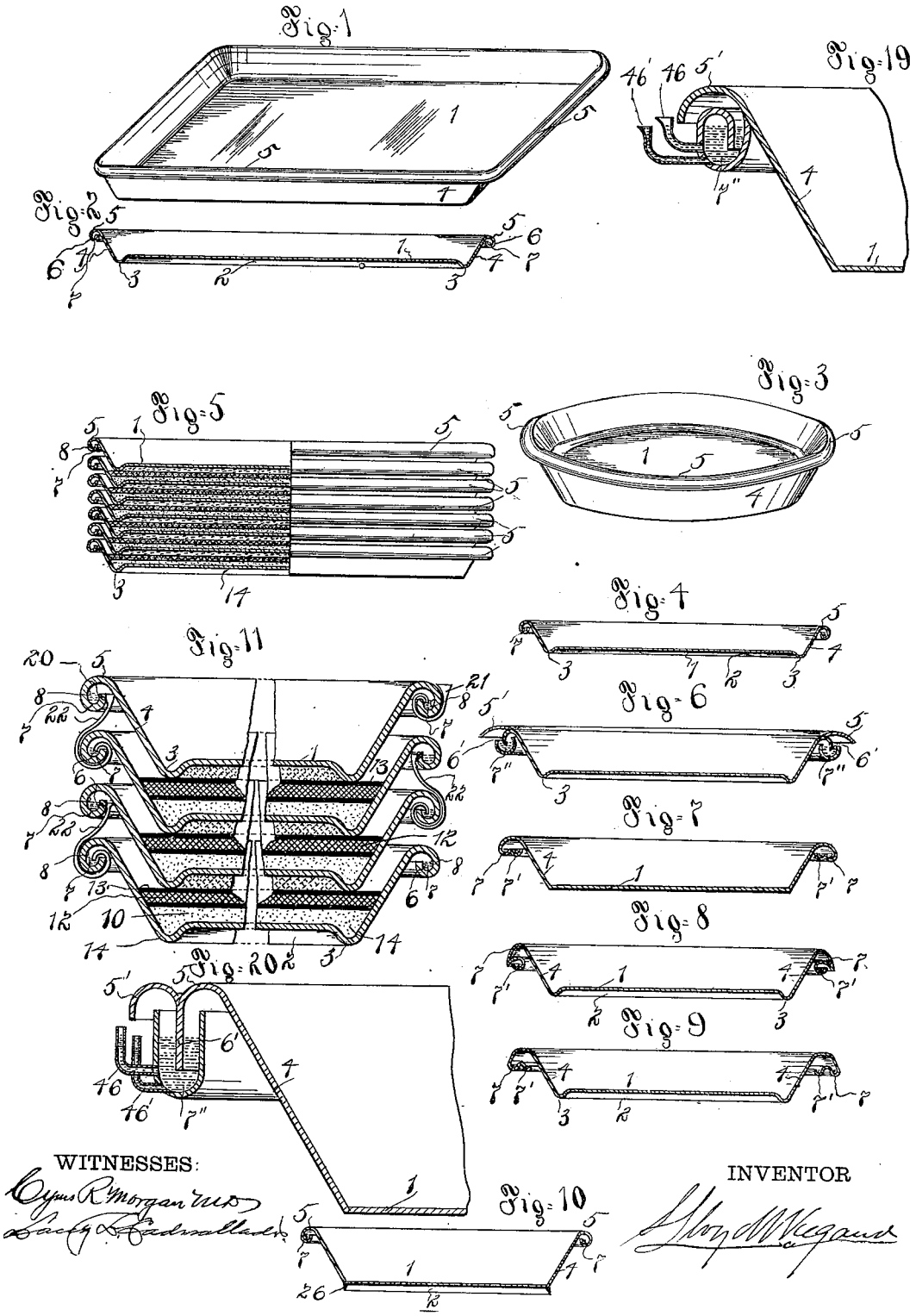
WITNESSES:
INVENTOR

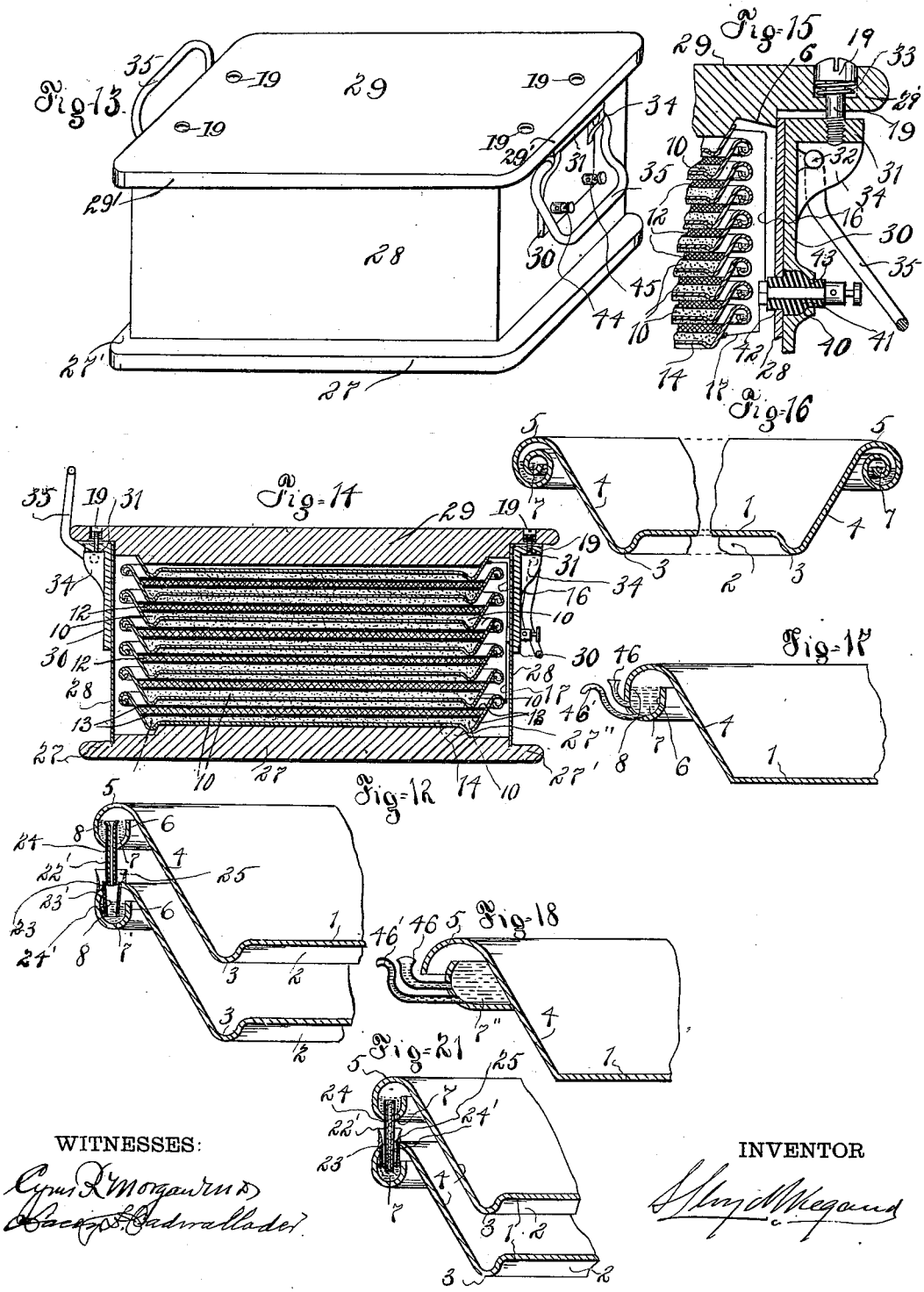

UNITED STATES PATENT OFFICE.

S LLOYD WIEGAND, OF PHILADELPHIA, PENNSYLVANIA.

ELECTRIC STORAGE BATTERY AND CONDUCTING-PLATE THEREFOR.

SPECIFICATION forming part of Letters Patent No. 650,885, dated June 5, 1900.

Application filed June 5, 1897. Renewed October 30, 1899. Serial No. 735,332. (No model.)

*To all whom it may concern:*

Be it known that I, S LLOYD WIEGAND, a citizen of the United States, residing at Philadelphia, in the county of Philadelphia and State of Pennsylvania, have invented certain new and useful Improvements in Electric Storage Batteries and Conducting - Plates Therefor; and I do hereby declare the following to be a sufficiently full, clear, and exact description thereof to enable others skilled in the art to make and use the said invention.

This invention relates to electrical secondary or storage batteries, and particularly to that class of batteries sometimes termed "tension-batteries," having conducting-plates of different polarity on opposite sides, with interposed layers of active material and an absorbent separating-stratum moistened with and containing an electrolytic liquid, the several elements acting in series.

The object of this invention is to insure continuous insulation between the opposite sides of the plates, to facilitate the proper placing and safe retention of the several strata between the plates, to cheaply produce and arrange the plates and strata into piles with the least labor, and, further, to provide for the easy inspection and testing of insulation while the battery is in service, and to incase the battery for convenient handling and safe transportation.

To this end this invention consists in a form of conducting plates or pans having on the under side a shallow cavity surrounded by a rim, a deeper cavity on the upper side inclosed by the outwardly-inclined sides of the pan, and a rim or rims at the top of the sides so curved as to form troughs or grooves in which a liquid or fusible insulating material will be retained by gravitation as well as by adhesion, and a protecting overhanging portion to prevent the electrolytic liquid from entering the troughs. Such plates are supplied with strata of active material and an electrolytic liquid in intermediate absorbent strata and superposed on each other, so as to operate in series to receive and deliver currents of higher tension or voltage proportioned to the number of plates and interposed strata in the pile.

The construction of this invention is hereinafter fully described, and shown in the accompanying drawings, in which—

Figure 1 shows a perspective view of one of the plates, of rectangular form, embodying part of this invention. Fig. 2 shows a vertical section thereof. Fig. 3 shows a perspective view of one of the plates of circular form, and Fig. 4 shows a vertical section thereof. Fig. 5 shows in elevation a pile of the plates, such as shown in Figs. 1 and 2, charged with strata of active material and absorbent material and with the insulating material in the rim, the left side of this figure being in section. Fig. 6 shows an enlarged section of a modified form of sides and rims for holding the insulating material. Figs. 7, 8, and 9 show modified forms of plates in cross-section. Fig. 10 shows in section a plate or pan having a rim on the bottom formed without a corresponding groove in the inside bottom of the pan, as shown in other figures. Figs. 11 and 12 show forms of this invention for continuously supplying non-conducting material to insulate the opposite surfaces of the plates or pans from each other. Fig. 13 shows in perspective view a battery as incased for use. Fig. 14 shows a vertical section thereof. Fig. 15 shows in enlarged sectional view the part of the case embracing the handles, the clamping-screw, and insulating-ferrules and binding - posts. Fig. 16 shows a sectional elevation of a plate or pan with the rim so curled as to form two troughs for holding insulating liquid. Fig. 17 shows a partial section of a pan with tubes for supplying and preventing overflow of the insulating liquid from the trough. Figs. 18, 19, and 20 show modifications thereof. Fig. 21 shows in section a modification of the part depicted in Fig. 12.

Referring to the first five figures of the drawings, 1 represents the flat bottom of the pan, and 2 a shallow cavity under it surrounded by a rim or ridge 3.

4 represents the inclined or flaring sides of the plate, having a rim 5, curved outwardly, downwardly, and then upwardly, so that the edge 6 is turned upward and forms a trough or groove 7 between it and the downward curve or curl 8 and without making contact with the metal above it. In this trough an insulating liquid is placed or a non-conducting fusible material, or both, forming an insulating band or zone between the opposite surfaces of the plate, so that in case of cracking crosswise or breaking of the insulating material from continuous intimate contact with the metal it flows together on the application of heat and causes it to reunite and restore the insulation.

In the form shown in Figs. 6 and 20 the trough 7″ is made as a separate part from the plate, and the edge 6′ of the pan dips into the non-conducting material contained in it. The outer edges 5′ of the pan overhang the trough 7″, so as to prevent any overflow of electrolytic liquid dropping into the trough 7″ and short-circuiting the plate. From the trough 7″ tubes 46 (shown in Fig. 20) extend outwardly, through which liquid insulating material can be introduced, and by observing the level of such liquid the depth of the insulation can be readily ascertained.

Tubes marked 46′, (shown in Figs. 17, 18, 19, and 20,) extending outwardly and upwardly from the bottom of the trough 7″ and terminating below the level of the top of the troughs 7″, afford the means of observing the depth of the insulating liquid in the troughs 7″ and prevent overflow of the troughs 7″.

The groove 7 should be protected in every instance from the entrance of electrolytic liquid.

In the form shown in Figs. 7, 8, and 9 the curl of the rim is made manifold, so as to inclose two or more troughs 7 and 7′, which arrangement helps to retain insulation in the grooves 7 and 7′, but are more expensive to make and trouble to fill.

The plates or pans above described are made of conducting ductile metal, rolled sheet-lead answering the purpose. The active material—say a stratum 2′ of moistened red lead—is filled into the bottom cavity 2 level with the ridges 3. A like stratum of moistened litharge 10 is filled into the pans on the upper side. Upon this is placed a thin layer 13 of asbestos felt, and on it a stratum of absorbent material 12 (charcoal in powder answers,) saturated with liquid electrolyte, is placed, and above this another layer of asbestos felt 13 is laid and another plate or pan similarly charged and insulated at the rim placed upon it, and so on until the entire height for the desired voltage or electric tension is attained. The plates before charging may be amalgamated, preferably by washing them with a solution of nitrate of mercury and with metallic mercury. A bottom conducting-plate 14, made and filled in the upper side, as above described, but with the lower cavity 2 empty, is laid under the pile and another plate, such as described, but which need not have the sides 4 and rim 5 and having only red lead filled in the lower cavity 2, but otherwise empty, is placed on the top, the plates being pressed together by the top 29 of the case, screws 19, and springs 33, or by both, as shown in Figs. 14 and 15. Conductors 16 and 17 from an electric generator are applied, respectively, to the top and bottom plates and the current passed through the pile, with the effect of converting the stratum of lead oxid upon one side of the plate into metallic lead and on the other side into peroxid of lead. When fully charged by the generator, a reverse electric current returns from the pile through the conductors and an interposed apparatus when electrically connected with each other. By using the form of plate with the described system of marginal insulation of the opposite sides of the plates from each other electric conduction through the pile of plates and interposed strata is continuously maintained.

A continuously-liquid insulation instead of a fusible and congealable material may be used in the trough 7, and by forming an overflow-passage 20, as shown in Fig. 11, slightly lower than the other parts of the edge 6 of the trough, and providing a guiding-tube or liquid-conductor 21, leading to the trough 7 of the top plate, the insulating fluid may be supplied to the groove in the top of the pile with great facility and thence to the others, and in the event of any excess of electrolytic liquid running over the edge of the pan the overflow does not reach the insulating ring or rim contained in the trough, and therefore the insulation remains unimpaired between the opposite sides of the plates.

In Figs. 11 and 21 are shown an arrangement of overflow tubes or conduits by which insulating fluid supplied to the rim or groove in the top plate fills that groove with a complete insulation of opposite surfaces from each other and discharges the surplus liquid into the grooves of the several plates below with like effect.

In Fig. 21 a tube 23 extends from the top of the rim downwardly below the surface of the liquid in the groove 7, and another tube 22′ extends from the surface-level of the liquid in the groove downwardly below the level of the liquid in the groove 7 of the pan below, so that the inner and outer sides of the tubes 21 and 23 are insulated by the liquid in the groove 7 and the several grooves are kept supplied with insulating liquid poured into the tube 21 of the top plate and overflowing successively the tubes 22 of the plates below and maintains the insulation of the opposite sides of each plate continuously.

In Fig. 11 the conduit or tube 21 is curved so as to pass under and upwardly around the rim of the lower pan and deliver the insulating liquid from the overflow of the trough in the pan above to that next below.

In Fig. 12 instead of a curved tube a straight tube 22′, leading from the surface-level of the liquid in the upper trough 7, passes through the bottom of that trough downward through an opening 23 in the top of the rim of the pan next below. The openings 23 are provided with tubes 23′, which extend downwardly into the insulating liquid in the trough 7, so as to insulate the opposite surfaces of the plate, and in order to prevent accidental electrical conduction or short-circuiting at this point by contact between the tubes 22' and 23' an insulating-covering 24, of glass or other non-conducting material, is applied to the exterior of the tube 22', or a lining 24', of like material, to the interior of the tube 23', or both, may be used. A rim 25, raised above the top of the rim of the pan around the opening 23 of the tube 23', serves to prevent any of the electrolytic fluid when overflowing the pan entering the tube 23'.

The continuously-liquid insulation is serviceable in stationary batteries, the congealable insulation being preferable for those in portable service.

The form of plate shown in Fig. 10 has the rim 26, which surrounds the bottom cavity 2, formed without any corresponding depression 3' in the greater cavity of the pan, and the rim 26 may be made of other material than the pan, its function being to confine the outer edge of the stratum of active material in the cavity 2.

In Figs. 13 and 14 is shown a complete cell or battery as incased. 27 represents the bottom of the case, the edges of which 27' project beyond the sides of the case-body 28, and the inner part (marked 27") extends up into and fits the part 28 and also into the cavity 2 of the bottom pan of the battery. The top of the cover 29 also extends beyond the body 28 at the part marked 29', and the central part fits into the top of the part 28 and also into the upper or deeper cavity of the top pan of the battery, so that when pressed downwardly the cover 29 presses the several pans and the interposed strata closely against each other. 30 are plates secured to the sides 28, having lugs 31, into which screws 19, passing through the cover 29, fit and draw the cover 29 downward. Springs 33, placed under the heads of the screws 19, serve to maintain constant pressure. Ears 34, formed on the plate 30, have bails or handles 35 fitted in apertures 32, so as to swing upward above the cover 29, as shown to the left in Figs. 13 and 14, to facilitate the lifting and carrying of the battery and when folded down, as shown in the right of these figures, lie within the vertical plane of the edges 29' and 27' of the cover 29 and bottom 27, so that the battery can be stored compactly. In the plate 30 are formed cavities 40, having inserted in them insulating-bushing 41, which project slightly in the cell or body of the case through openings 42 in the sides 28 and through openings 43 in the plate 30. Into these bushings 41 binding-posts 44 and 45 are inserted, and the inner ends of the binding-posts 44 and 45 are electrically connected by insulated conductors 16 and 17 with the top and bottom pan or plates of the battery.

The pans or plates may be made, as shown in Fig. 7, without the cavity 2 and ridge 3, but with a curved edged rim and trough 7 for holding the insulating material, the layer or stratum of metallic oxid being placed on the top of the absorbent stratum 12; but such construction is less convenient to make, in that the gaging of the thickness of the stratum demands more care in the absence of the ridge 3 than to guide the leveling of the surface by passing a roller or sweep over it, resting upon the ridges 3. It is practicable to place the red lead and the litharge strata in reversed positions, the effect being a reversal of the direction of the currents.

I believe I am the first to invent and make conducting-plates for storage batteries having different polarity on opposite sides with troughs in the rims for holding by gravitation a liquid or fusible insulation protected from the entrance of the electrolytic liquid and susceptible of replenishing without segregating the parts of the pile or disturbing the operation of the battery, and entitled to claim all forms of conducting-plates provided with such troughs, and the first to make plates with liquid insulation between oppositely-polarized surfaces of the plates and entitled to claim, broadly, plates having such insulation by liquid and also to devices for replenishing the insulation without interrupting the use of the battery.

Having described my invention, what I claim is—

1. A conducting-plate for storage batteries, having a rim raised around the under surface, inclosing a flat cavity and inclined sides around the upper side of said plate, terminating in a curled edge containing one or more troughs retaining by gravitation a liquid insulating material, or insulating material adapted to become liquid, and means to protect said insulating material from overflow of electrolyte as set forth.

2. In pans of conducting-plates for storage batteries marginal rims curved so as to form one or more troughs retaining by gravitation liquid non-conducting material and means to protect said troughs from overflow of electrolyte as set forth.

3. A secondary or storage battery, having horizontal conducting-plates of different polarity on opposite sides, each provided with a trough at the edge, containing a liquid insulating material, and conduits to receive further supplies of insulating liquid as set forth.

4. In a storage battery, a series of horizontal flat-bottomed conducting-pans charged or coated with active material, or material adapted to become active, interposed layers of absorbent material moistened with electrolytic liquid, rims upon said plates adapted to confine the active material, and electrolytic liquid and absorbent stratum, in combination with troughs surrounding the margin of said plates, and adapted to receive and retain by gravitation an insulating material in a liquid state, substantially as and for the purpose set forth.

5. Conducting-plates for storage batteries combined with marginal troughs for holding insulation between the opposite sides thereof, and overhanging edges to exclude electrolytic fluid from the troughs as set forth.

6. Conducting-plates for storage batteries having marginal troughs containing liquid insulation between opposite sides thereof, in combination with conduits for insulating liquid leading downwardly from said plates and immersed in the insulating liquid in the trough below as set forth.

7. Conducting-plates for storage batteries having liquid insulating material, or material adapted to become liquid, between the opposite sides of said plates, combined with conduits for liquid, covered with non-conducting material to prevent accidental conducting contact of surfaces of adjacent plates, as set forth.

8. In conducting-plates for storage batteries troughs for holding insulating material in a liquid state, on or near the margin thereof, to insulate the opposite surfaces of said plate, combined with overflow-conduits for such insulating material, and a rim or dam to defend said overflow-conduits from ingress of electrolytic liquid as set forth.

9. In storage batteries having plates of different polarity on opposite sides, troughs containing an insulating liquid, in combination with the edges of the plate immersed in said troughs of liquid, and tubes to supply said troughs with liquid, as and for the purpose set forth.

10. In tension storage batteries, a series of conducting-plates, interposed strata of active material, and strata containing electrolytic fluid, in combination with troughs containing liquid insulating material, or material adapted to become liquid, and an edge or girdle of each plate immersed in said material in the troughs, insulating opposite sides thereof as set forth.

11. In a tension storage battery, a case having practically-parallel sides, a lid fitting in the said sides and provided with overhanging projections, said case containing a pile of superposed plates coated with active material and interposed strata of absorbent material, containing an electrolyte all under compression from the lid, in combination with springs and screws fitted in said projections, and nuts attached to the sides of said case fitting said screws as and for the purpose set forth.

12. In a tension storage battery, a series of superposed and horizontally-arranged pans, having insulating edges, and coated with active material, and interposed absorbent strata containing electrolytic liquid, a case having a bottom, and sides attached thereto, inclosing said pans and strata, in combination with a lid fitted to enter the top of said case and press upon said pans and strata, projections on said lid beyond the sides, screws fitted through said projections and nuts exterior to said case attached to the sides of the case, all arranged to operate as set forth.

13. A combined handle and clamping device and conductor protection for storage-battery cases, consisting of a plate adapted to attach the same to the ends of such cases, nuts for screws, sockets for insulators, and ears for a bail, all formed integrally with said plate, in combination with swinging bails engaged in said ears, insulators in said sockets, and screws in said nuts adapted to clamp the lid of said cases into and on the sides thereof as set forth.

14. In a tension storage battery, a case having a bottom, sides attached thereto, a pile of pans having insulating-rims, and coatings of active material, and absorbent strata containing electrolytic liquid interposed between said coated pans, in combination with a lid fitting into said case and arranged to rest on the pile of pans, projections on said lid, and screws, springs on said screws and nuts exterior to and attached to the sides of said case arranged to compress the pile of pans and intervening strata as set forth.

S LLOYD WIEGAND.

Witnesses:
C. R. MORGAN,
A. A. MORGAN.